US007795579B2

(12) United States Patent
Komatsu et al.

(10) Patent No.: US 7,795,579 B2
(45) Date of Patent: Sep. 14, 2010

(54) INFORMATION OBTAINING METHOD

(75) Inventors: Manabu Komatsu, Kawasaki (JP); Hiroyuki Hashimoto, Yokohama (JP); Yohei Murayama, Yokohama (JP); Kazuhiro Ban, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 351 days.

(21) Appl. No.: 12/120,512

(22) Filed: May 14, 2008

(65) Prior Publication Data

US 2008/0290268 A1 Nov. 27, 2008

(30) Foreign Application Priority Data

May 25, 2007 (JP) ............................ 2007-138946

(51) Int. Cl.
*B01D 59/44* (2006.01)

(52) U.S. Cl. ...................................................... 250/282

(58) Field of Classification Search ................. 250/282, 250/281, 287, 288
See application file for complete search history.

(56) References Cited

U.S. PATENT DOCUMENTS

| | | | | |
|---|---|---|---|---|
| 2004/0132080 | A1 | 7/2004 | Kawaguchi et al. | |
| 2007/0105087 | A1 | 5/2007 | Ban et al. | |
| 2008/0090267 | A1 | 4/2008 | Komatsu et al. | |
| 2008/0108132 | A1 | 5/2008 | Ban et al. | |
| 2008/0128608 | A1* | 6/2008 | Northen et al. | 250/282 |
| 2008/0268497 | A1 | 10/2008 | Hashimoto et al. | |
| 2008/0277576 | A1 | 11/2008 | Komatsu et al. | |
| 2008/0278706 | A1 | 11/2008 | Murayama et al. | |
| 2009/0005495 | A1 | 1/2009 | Ban et al. | |

OTHER PUBLICATIONS

U.S. Appl. No. 12/065,720, 371(c) Date: Mar. 4, 2008, Applicants: Kazuhiro Ban, et al.

U.S. Appl. No. 11/995,911, 371(c) Date: Jan. 16, 2008, Applicants: Takeshi Imamura, et al.

Kuang Jen Wu, et al., Matrix-Enhanced Secondary Ion Mass Spectrometry: A Method for Molecular Analysis of Solid Surfaces, Analytical Chemistry, vol. 68, No. 5, Mar. 1, 1996, pp. 873-882.

Anna M. Belu, et al., "Enhanced TOF-SIMS Imaging of a Micropatterned Protein by Stable Isotope Protein Labeling", Analytical Chemistry, vol. 73, No. 2, Jan. 15, 2001, pp. 143-150.

David S. Mantus, et al., "Static Secondary Ion Mass Spectrometry of Adsorbed Proteins", Analytical Chemistry, vol. 65, No. 10, May 15, 1993, pp. 1431-1438.

Matthew S. Wagner, et al., "Limits of detection for time of flight secondary ion mass spectrometry (ToF-SIMS) and X-ray photoelectron spectroscopy (XPS): detection of low amounts of adsorbed protein", J. Biomater. Sci. Polymer Edn., vol. 13, No. 4, (2002), pp. 407-428.

* cited by examiner

*Primary Examiner*—Kiet T Nguyen
(74) *Attorney, Agent, or Firm*—Fitzpatrick, Cella, Harper & Scinto

(57) ABSTRACT

An information obtaining method for obtaining information about a mass of a component of an analyte using a time of flight mass spectrometer and obtaining information about a distribution state of the component based on the obtained information about the mass includes the step of: (1) adding a self-reactive substance to the analyte on a base to facilitate ionization of the component; (2) irradiating the analyte with a primary beam in the presence of the self-reactive substance, thereby ionizing the components and allowing resulting ions to fly; (3) obtaining information about mass of the flying ions using the time of flight mass spectrometer; and (4) obtaining information about the distribution state of the component on the base based on the information about the mass.

10 Claims, 3 Drawing Sheets

INFORMATION OBTAINING METHOD

BACKGROUND OF THE INVENTION

1. Field of the Invention

The present invention relates to a method for obtaining information about an analyte using a time of flight mass spectrometer, and more particularly, to a method for imaging detection of components, such as proteins or other organic substances, of the analyte on a type by type basis.

2. Description of the Related Art

Recently, with advances in genome analysis, increasing importance is given to techniques for analyzing proteins which are gene products existing in a living body, and more particularly, techniques for visualization of protein chips or proteins which have a distribution state such as found in living tissue.

Conventionally, importance of expression and functional analysis of proteins have been pointed out and analysis techniques have been developed. Basically, such techniques are based on a combination of: (1) separation and refining by means of two-dimensional electrophoresis or high-performance liquid chromatography (HPLC) and (2) a detection system including radiation analysis, optical analysis and mass spectrometry.

Development of a protein analysis technique is roughly divided into database construction by means of proteome analysis (comprehensive analysis of intracellular proteins) which, in a sense, is the basics of protein analysis and development of diagnostic devices or drug discovery devices (drug-candidate screening) devices based on the resulting database. However, conventional methods often leave problems in terms of analysis time, throughput, sensitivity, resolution and flexibility. In any application, there is demand for devices different from the conventional methods with such problems and suitable for downsizing, speedup and automation. To meet this demand, development of a so-called protein chip in which protein is packed densely has been drawing attention. The protein chip is formed by fixing protein which will serve as a probe to a substrate surface and forming an organic film around the fixed protein to prevent nonspecific absorption. Then, the protein chip is used for diagnosis or screening by pouring a solution containing a target drug candidate onto the protein chip and assessing an amount of absorption through an antigen-antibody reaction.

However, there is no way to evaluate precisely whether the protein chip has been formed properly because it is difficult to obtain two-dimensional distribution of the protein in a minute area at the current level of technology.

In mass spectrometry (MS) of proteins, time of flight secondary ion mass spectrometry (hereinafter abbreviated to TOF-SIMS) has come to be used recently as a means of high-sensitivity mass analysis or as a means of surface analysis.

The TOF-SIMS is an analysis method which is used to check what atoms or molecules are present on an outermost surface of a solid sample. The method has the following features: (1) capable of detecting components in trace amounts on the order of $10^9$ atoms/cm$^2$; (quantity corresponding to $1/10^5$ of the outermost surface mono atomic layer); (2) applicable to both organic and inorganic substances and capable of measuring all elements and compounds on the surface; and (3) capable of secondary-ion imaging from substances existing on the sample surface.

Principles of the method will be described briefly below.

When a high-speed pulsed ion beam (primary ions) is directed onto a surface of a solid sample in a high vacuum, components on the surface are released into the vacuum by sputtering. Positively or negatively charged ions (secondary ions) thus generated are focused in one direction by means of an electric field and detected at a location some distance away. When primary ions are directed at a solid surface in a pulsed manner, secondary ions with various masses are generated depending on the composition of the sample surface. In so doing, lighter ions fly faster and heavier ions fly more slowly. Thus, the masses of the generated secondary ions can be analyzed by measuring the time (time of flight) required for the secondary ions to be detected after being generated. When the primary ions are directed onto a solid sample surface, only the secondary ions generated in the outermost layer of the solid sample surface are released into the vacuum, which provides information about the outermost surface (approximately a few Angstroms deep) of the sample. Since TOF-SIMS uses an extremely small dose of primary-ion irradiation, organic compounds are ionized with their chemical structures maintained, allowing the structures of the organic compounds to be learned from a mass spectrum. However, when subjected to TOF-SIMS under normal conditions, artificial polymers such as polyethylene or polyester or biopolymers such as protein are broken down into small fragment ions, making it difficult to know the original structures. On the other hand, when the solid sample is an insulator, the solid sample can be analyzed because positive charge accumulated on the solid surface can be neutralized by pulses of an electron beam directed at interstices among the primary ions emitted in a pulsed manner. In addition, TOF-SIMS allows an ion image (mapping) on the sample surface to be measured by scanning the sample surface with a primary-ion beam.

Examples of protein analysis using TOF-SIMS include a method which detects parent protein molecules of a high molecular weight by mixing the protein with a matrix substance using a pre-processing process similar to a MALDI process (Kuang Jen Wu et al., Anal. Chem., 68, 873, (1996)). Also, there is a method in which part of a particular protein is labeled with an isotope such as $^{15}N$ and the protein is detected by imaging using secondary ions such as $C^{15}N^-$ (A. M. Belu et al., Anal. Chem., 73, 143, (2001)). Furthermore, there are a method which estimates types of protein from types and relative strength of fragment ions (secondary ions) corresponding to amino acid residues (D. S. Mantus et al., Anal. Chem., 65, 1431, (1993)) and a method which determines detection limits of TOF-SIMS with respect to proteins absorbed by various substrates (M. S. Wagner et al., J. Biomater. Sci. Polymer Edn., 13, 407, (2002)).

Other mass spectrometric methods for protein include a method which uses field emission. The method causes the protein to form a coordinate or covalent bond on a metal electrode via an open group which can be split according to applied energy and then leads the protein to a mass spectrometer by the application of an intense electric field.

As described above, various methods have been proposed for analyzing a distribution state of a plurality of proteins contained in an analyte using mass spectrometry. However, since conventional mass spectrometry analyzes proteins or the like eluted from living tissue or protein chips by means of an appropriate solvent rather than analyzing the subject component itself, there is a limit to obtaining original distribution information about a sample. Also, the conventional mass spectrometry, with which it is difficult to know the distribution state of the proteins serving as a probe, cannot directly assess nonspecific absorption into chip surfaces.

The MALDI process and a SELDI process which is a modification of the MALDI process are the most flexible ionization method known today and have the excellent feature of being able to ionize degradable proteins of high molecular weight as they are and detect parent ions or equivalent ions. Currently, the MALDI and SELDI processes are one of standard ionization methods for mass spectrometry of proteins. On the other hand, when the methods are used for mass spectrometry of protein chips, the existence of a matrix substance makes it difficult to obtain a two-dimensional distribution image (imaging based on mass information) of protein with a high spatial resolution. That is, although a laser beam itself used as an excitation source can be focused into a diameter of approximately 1 to 2 μm, vaporization and ionization of the matrix substance existing around the protein to be analyzed are unavoidable even under laser irradiation with such a small spot. Under these circumstances, when a two-dimensional distribution image of protein is measured by any of the above methods, spatial resolution is generally somewhere around 100 μm. For scanning with the focused laser, it is necessary to move lenses and mirrors in a complicated manner. That is, when measuring a two-dimensional distribution image of protein by any of the above methods, it is generally difficult to scan a laser beam and only available method is to move a stage with a test sample mounted. To obtain a two-dimensional distribution image of protein by increasing spatial resolution, a method which involves moving a sample stage is not advisable.

Furthermore, in addition to the problem in obtaining a two-dimensional distribution image of protein by increasing spatial resolution, there are restrictions on the form of samples to be analyzed, such as a need to fix an object on a metal electrode.

Compared to the above methods, the TOF-SIMS technique, which uses primary ions, can easily focus and scan the primary ions and is suitable for obtaining a two-dimensional ion image (two-dimensional distribution image) of a high spatial resolution. The TOF-SIMS technique provides a spatial resolution of somewhere around 1 μm. However, when the analyte is protein or an inorganic compound, TOF-SIMS measurements under normal conditions mostly produce small fragment ions as secondary ions, making it generally difficult to know the original structure, as described above. Thus, in dealing with a sample such as a protein chip in which a plurality of proteins are arranged on a substrate, some measures must be devised to obtain a two-dimensional ion image (two-dimensional distribution image) of a high spatial resolution which will allow the types of the proteins to be identified. The method proposed by Kuang Jen Wu et al. can suppress degradation due to irradiation with primary ions even in the case of protein of high molecular weight and thereby detect the parent molecules while maintaining original mass. However, the method uses a mixture of protein and a matrix substance and cannot obtain original two-dimensional distribution information in the case of a sample such as the protein chip. Since the method proposed by A. M. Belu et al. isotope-labels part of a particular protein, the method can make full use of the high spatial resolution of TOF-SIMS. On the other hand, the method must isotope-label the particular protein every time. Also, with the method proposed by D. S. Mantus et al., i.e., the method which estimates types of protein from types and relative strength of fragment ions (secondary ions) corresponding to an amino acid residues, it may be difficult to determined the types of protein if there coexist proteins with similar amino acid structures.

If the TOF-SIMS technique is applied, with peptide chains of the protein molecules being held together, for example, to protein molecules in living tissue, production efficiency of secondary ion species is greatly reduced. For measurements by means of the TOF-SIMS technique, which involves primary-ion irradiation in a high vacuum, a sample to be measured is dried in advance. During the drying, if protein molecules and other biological material in the living tissue interact with each other and aggregate due to intermolecular bonding, the production efficiency of the secondary ion species is reduced further.

To analyze quantity of particular protein molecules present in living tissue with high detection sensitivity at a high level of quantification and perform two-dimensional imaging concerning quantity distribution of the particular protein molecules in a cut surface of the living tissue, it is important to solve the problem of holding of protein molecules. In other words, it is important to allow ions to fly efficiently by slowly releasing the protein molecules held together in the living tissue by ion sputtering through primary-ion irradiation. Such a flying state allows secondary ion species of effective parent molecules to be produced reliably.

SUMMARY OF THE INVENTION

However, the conventional techniques are not sufficient in these respects.

The present invention has been made to solve the above problems and has an object to provide a method for obtaining information from an analyte, the method being capable of obtaining a two-dimensional distribution image of a high spatial resolution for each type of analyte using TOF-SIMS. Another object of the present invention is to provide a method for analyzing composition of the analyte.

After closely examining the above problems, the inventors have made the present invention. The present invention provides an information obtaining method for obtaining information about a mass of a component of an analyte using a time of flight mass spectrometer and obtaining information about a distribution state of the component based on the obtained information about the mass, comprising: adding a self-reactive substance to the analyte on a base to facilitate ionization of the component; irradiating the analyte with a primary beam in the presence of the self-reactive substance, thereby ionizing the components and allowing resulting ions to fly; obtaining information about a mass of the flying ions using the time of flight mass spectrometer; and obtaining information about the distribution state of the component on the base based on the information about the mass.

According to the present invention, adding a self-reactive substance to the analyte allows parent molecular ions of a component of the analyte to be generate efficiently in TOF-SIMS analysis. Furthermore, imaging detection can be performed with a two-dimensional distribution state of the component maintained.

Further features of the present invention will become apparent from the following description of exemplary embodiments with reference to the attached drawings.

BRIEF DESCRIPTION OF THE DRAWINGS

FIG. 2A shows an observed spectrum of a peptide film treated with an acetone solution alone, and an enlarged spectrum diagram of a region near $[(\text{Enkephalin})+(\text{Na})]^+$ is shown inside; FIG. 2B shows an observed spectrum of a peptide film treated with an acetone solution of nitrocellulose, and an enlarged spectrum diagram of a region near $[(\text{Enkephalin})+(\text{Na})]^+$ is shown inside; and FIG. 2C shows a theoretical spectrum of an [(Enkephalin)+(Na)] ion.

DESCRIPTION OF THE EMBODIMENTS

Hereinafter, the exemplary embodiments of the present invention will be described with reference to the attached drawings.

The present invention provides an information obtaining method for obtaining information about a mass of a component of an analyte using a time of flight mass spectrometer and obtaining information about a distribution state of the component based on the obtained information about the mass. The information obtaining method according to the present invention includes at least the following steps: (1) a step of adding a self-reactive substance to the analyte on a base to facilitate ionization of the component; (2) a step of irradiating the analyte with a primary beam in the presence of the self-reactive substance, thereby ionizing the components and allowing resulting ions to fly; (3) a step of obtaining information about a mass of the flying ions using the time of flight mass spectrometer; and (4) a step of obtaining information about the distribution state of the component on the base based on the information about the mass obtained in step (3).

Figure 1:
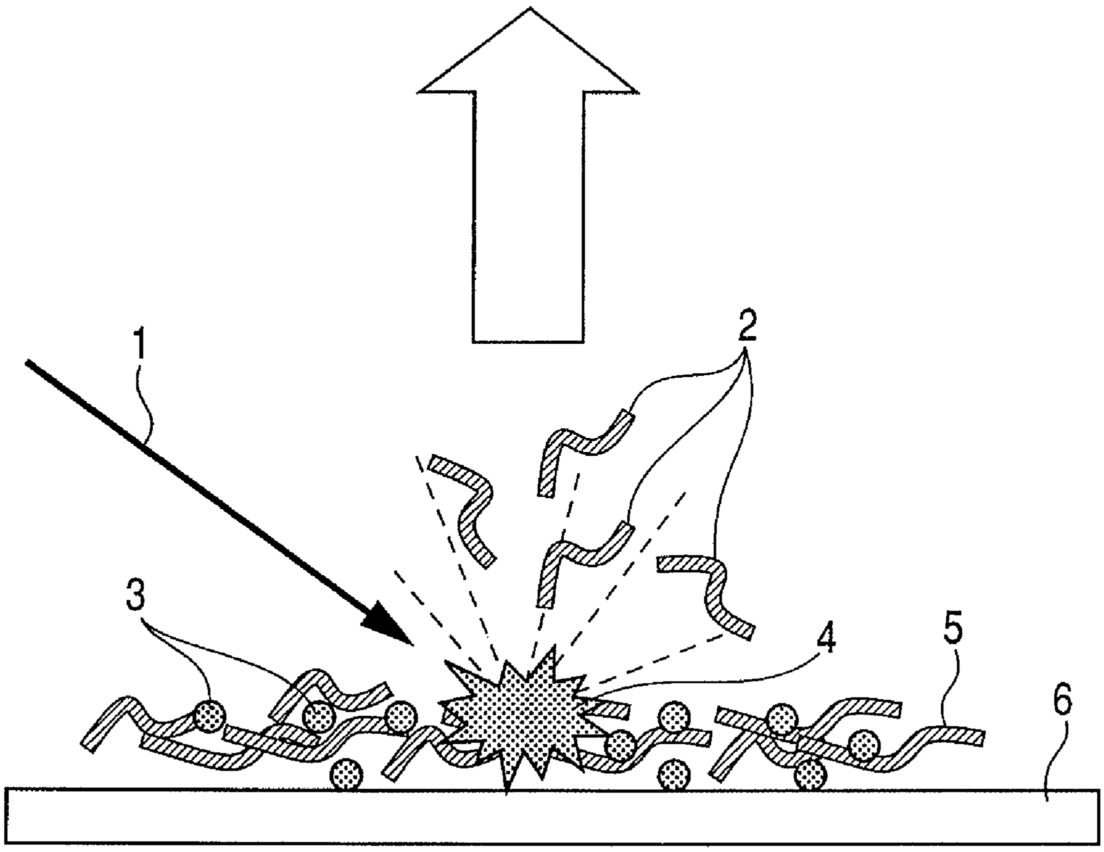
FIG. 1 is a diagram showing how information is obtained according to the present invention.

An example of the information obtaining method according to the present invention will be described below with reference to FIG. 1. FIG. 1 is a schematic sectional view showing a protein 5 placed as an analyte on a surface of a substrate 6 which is a base. As shown in FIG. 1, first a self-reactive substance 3 is added to the analyte piled up on the substrate 6 to facilitate ionization of the protein 5 which is a major component of the analyte. The self-reactive substance 3 is dispersed in the analyte 5. Next, a shock is given to the self-reactive substance 3 by a primary beam 1 to set off a very local explosion 4, thereby allowing the component 5 to fly softly. This suppresses production of fragment ions to solve one of the problems with TOF-SIMS, releases the protein held together, allows the protein to fly efficiently, and thereby facilitates ionization. The method obtains information about mass of the ions 2 resulting from the ionization using a time of flight mass spectrometer and further obtains information about a distribution state of the component with the analyzed mass based on the obtained information about the mass.

Components of the analyte about which information is obtained by the method according to the present invention generate ions which lend themselves to mass spectrometry. The use of primary-ion irradiation in the presence of a self-reactive substance allows the method according to the present invention to improve sensitivity and makes the method suitable for components made of protein or an inorganic compound. Incidentally, when the analyte consists of a single component, the analyte is identical with the component. The present invention is also applicable when the analyte includes protein and a complex of the protein and the component includes fragments of the protein. Furthermore, the analyte may include more than one type of protein as in the case of a cell or living tissue. In that case, secondary information about protein distribution in the cell or living tissue can be obtained as well.

With the method according to the present invention, the self-reactive substance is added to the analyte in such a way as not to affect distribution of the analyte on the base. For example, the self-reactive substance may be added by adding a liquid containing the self-reactive substance to the analyte on the base once to allow the distribution state of the component (analyte) on the base to be maintained. The liquid containing the self-reactive substance may be suitably added to the analyte in the form of minute droplets using a micropipettor or an inkjet printer.

The self-reactive substance is a substance (including a compound) which contains combustible part and oxygen supply part in the same molecule and causes an abrupt oxidation reaction (e.g., explosion) in response to an external stimulus. Examples of self-reactive substances include organic peroxides, nitric esters, nitro compounds, nitroso compounds, azo compounds, diazo compounds and hydrazine derivatives. The present invention can select and use at least one of these substances. Concrete examples of self-reactive substances further include: organic peroxides: benzoyl peroxide and methyl ketone peroxide; nitric esters: methyl nitrate, ethyl nitrate, nitroglycerin and nitrocellulose; nitro compounds and nitroso compounds: picric acid, trinitrotoluene and dinitrosopentamethylenetetramine; azo compounds and diazo compounds: azobisisobutyronitrile and diazonitrophenol; and hydrazine derivatives: hydrazine nitrate, guanidine nitrate and sodium azide.

Among the above substances, it is desirable to use at least nitrocellulose.

To add the self-reactive substance as a liquid to the analyte, it is desirable to use a solution containing the self-reactive substance. In that case, a solvent can be selected according to the type of self-reactive substance to be used. For example, when the self-reactive substance is nitrocellulose, a volatile organic solvent such as acetone, chloroform or toluene can be used suitably. The use of the volatile solvent has the advantage of dispersing the solvent after the addition of the solution and reducing the effect of the solvent on the analysis.

The information about the mass of the component obtained according to the present invention concerns at least one of: (1) an ion which corresponds to a mass number obtained by adding any of one to ten atoms of one or more elements selected from the group consisting of hydrogen, carbon, nitrogen and oxygen to mass of a parent molecule, i.e., the mass of the substance itself; (2) an ion which corresponds to a mass number obtained by adding any of one to ten atoms of one or more elements selected from the group consisting of hydrogen, carbon, nitrogen and oxygen to the mass of the parent molecule, i.e., the mass of the substance itself to which at least one of a metal element such as Ag or Au and an alkali metal element such as Na or K has been added; (3) an ion which corresponds to a mass number obtained by removing any of one to ten atoms of one or more elements selected from the group consisting of hydrogen, carbon, nitrogen and oxygen from the mass of the parent molecule, i.e., the mass of the substance itself; and (4) an ion which corresponds to a mass number obtained by removing any of one to ten atoms of one or more elements selected from the group consisting of hydrogen, carbon, nitrogen and oxygen from the mass of the parent molecule, i.e., the mass of the substance itself to which at least one of a metal element such as Ag or Au and an alkali metal element such as Na or K has been added.

The primary beam can be selected from: (A) an ion beam, proton beam and electron beam which are focused on a surface of the base having the analyte, pulsed, and capable of being scanned; and (B) a laser beam which is focused on a surface of the base having the analyte, pulsed, and capable of being scanned.

After the mass of the component is defined, information about a two-dimensional distribution state of the component on the substrate can be obtained based on the information about the mass obtained by using the ions resulting from irradiation with the primary beam, i.e., based on detection results of the flying ions.

The present invention will be described in more detail below.

According to the present invention, to facilitate ionization of the subject component, molecules of the self-reactive substance is placed around the subject component at predetermined intervals in advance and a local explosion is set off by a shock given to the self-reactive substance in the form of irradiation with the primary beam. Force of the explosion causes the subject component in and around the local area to fly. The explosion-based method is similar to a method for vaporizing a substance by means of photoexcitation using a matrix substance based on the MALDI process. This provides information about the mass of secondary ions in such large molecules that will softly ionize and accurately identify an analyte. On the other hand, unlike the vaporization method by means of photoexcitation and heat transmission based on the MALDI process, the method according to the present invention gives shocks to the molecules of the self-reactive substance arranged at appropriate intervals using a focused primary beam of electrons, charged particles or laser with a beam diameter of a few nm to a few hundred nm. This triggers an explosive reaction in a minute area, allowing ions to fly from a sufficient quantity of the component using a small quantity of the self-reactive substance. Consequently, by suppressing chain reaction of shocks due to heat transmission, a two-dimensional distribution state of the analyte can be detected (imaged) with a fine spatial resolution approximately equal to the beam diameter. In view of the above points, to ionize the component to be subjected to mass spectrometry and send the resulting ions flying, one of the primary beams described above can be used suitably.

According to the present invention, at least one of the following methods can be used as a method for adding the self-reactive substance to the analyte, where the self-reactive substance serves as a substance (sensitizer) which facilitates ionization of the component: (1) a method of adding the self-reactive substance after the analyte is placed on a base; (2) a method of adding the self-reactive substance to one or more particular types of component in the analyte before the analyte is placed on the base; and (3) a method of adding the self-reactive substance to the base before the analyte is placed on the base.

Of the above methods, (1) can be used for analysis of every type of subject component, meaning that (1) is a versatile method. On the other hand, when adding a substance which facilitates ionization to an analyte distributed two-dimensionally on the base, it is necessary to take care not to disperse the subject component by the addition process. Objects of the present invention cannot be achieved if the substance addition process changes the two-dimensional distribution of the analyte. To check whether the two-dimensional distribution has been changed, a comparison can be made with results of TOF-SIMS analysis conducted on a protein chip which has not undergone the addition process.

Method (2) involves adding a substance (sensitizer) to a particular type of component in the analyte in advance to facilitate ionization and increase sensitivity of the component during TOF-SIMS analysis. The method has the advantage of being able to detect the two-dimensional distribution state of the particular subject component selectively with high sensitivity. On the other hand, the method has the disadvantage of having to add the sensitizer to each subject component in advance, which complicates operation to some extent.

Method (3) involves forming a substance (sensitizer) on a surface of the base in advance to facilitate ionization and increase sensitivity of the component during TOF-SIMS analysis. With this method, it is important to thoroughly check in advance whether the presence of the sensitizer will not newly create a problem of nonspecific absorption. It is desirable to form the sensitizer on the outermost surface of the base, but another substance approximately as thick as a monomolecular film may be placed on the sensitizer to prevent nonspecific absorption.

The addition process according to the present invention is effective in increasing ionization efficiency of a component (e.g., protein) in the process of generating secondary ions during TOF-SIMS analysis as described above. There is no particular limit to the addition process as long as the addition process does not change the two-dimensional distribution state of the component.

Also, to add the self-reactive substance to the protein distributed two-dimensionally on the base without changing the two-dimensional distribution state, it is necessary to take care not to disperse the protein. If a liquid containing the self-reactive substance is dropped slowly on that part of the base on which the protein is placed, the sensitizer can be added simply in a single process operation without changing the two-dimensional distribution state of the protein. However, the methods for adding the sensitizer are not limited to those described above, and any method may be used as long as the method is effective in increasing the ionization efficiency of the subject component during TOF-SIMS analysis and does not change the two-dimensional distribution state of the subject component.

According to the present invention, the base on which the analyte is placed is a metal plate or a substrate whose surface is coated with a metal film, but is not limited thereto. In the case of a protein component, protein chips having a conductive substrate made of silicon or the like or insulative layer made of organic polymer, glass or the like may also be used as long as the substrate does not generate secondary ions of such a mass that will get in the way of obtaining protein-mass information. Furthermore, the base for use to place the protein to be analyzed is not limited to those in the form of a substrate, and a solid substance of any form including a powdery substance and particulate substance may be used. Even if a powdery or particulate substance with an irregular surface is used as the base, the component can be ionized without a problem as long as irradiation with a primary beam is enabled.

In detecting (imaging) two-dimensional distribution state of a subject component, the present invention uses secondary ions which allow identification of the component. Desirably, the secondary ions have a mass-to-charge ratio of 500 or higher, and more desirably a mass-to-charge ratio of 1000 or higher.

Regarding primary ion species, gallium ions and cesium ions, and in some cases, gold (AU) ions, bismuth (Bi) ions, and carbon fullerene ($C_{60}$) ions are used suitably from the viewpoint of ionization efficiency and mass resolution. The use of Au ions, Bi ions, and $C_{60}$ ions is desirable because these ion species enable very highly sensitive analysis. In addition to Au ions and Bi ions, polyatomic ions of gold and bismuth, namely, $Au_2$ ions, $Au_3$ ions, $Bi_2$ ions, and $Bi_3$ ions may be used as well. The sensitivity provided by the ions often increases in this order, and thus the use of polyatomic ions of gold and bismuth is more desirable.

It is desirable that pulse frequency of the primary-ion beam is in the range of 1 kHz to 50 kHz, that energy of the primary-ion beam is in the range of 12 keV to 25 keV, and that pulse width of the primary-ion beam is in the range of 0.5 ns to 10 ns.

Also, according to the present invention, it is necessary to maintain a high mass resolution and to complete measurements in a relatively short period of time (on the order of a few tens of seconds to a few tens of minutes per measurement) in order to improve quantification accuracy, and thus it is desirable to take measurements by sacrificing the primary-ion beam diameter to some extent. Specifically, it is desirable to set the primary-ion beam diameter in the range of 1 μm to 10 μm instead of reducing the diameter to the order of submicrons.

The present invention will be described in more detail below by citing examples. Concrete examples described below are exemplary embodiments of the present invention, but the present invention is not limited to these concrete examples.

EXAMPLES

Example 1

Protein Spotting on an Au/Si Substrate, Nitrocellulose Treatment, and TOF-SIMS Analysis To verify ionization/sensitization effects of nitrocellulose used as a self-reactive substance, a solution was added dropwise to a peptide sample and TOF-SIMS measurements were taken as follows.

Preparation of the sample will be described first. A silicon substrate without containing impurities was washed by acetone and deionized water in sequence, an Au film was formed to a thickness of 100 nm on the silicon substrate, and then the silicon substrate was used as a substrate. A 10-μM aqueous solution of Methionine Enkephalinamide ($C_{27}H_{36}N_6O_6S$ with an average molecular weight of 572.7; hereinafter referred to as Enkephalin) purchased from SIGMA Co. was prepared using deionized water. The aqueous solution was spotted (with a spot diameter of approximately 10 mm) on the Au-coated silicon substrate using a micropipettor and allowed to dry under natural conditions. Consequently, Enkephalin thin films were formed on the substrate. Then, 2 μl of acetone solution containing 0.1% of dissolved nitrocellulose was spotted (with a spot diameter of approximately 5 mm) onto the thin films. The substrate was dried under natural conditions and used for TOF-SIMS analysis. At this time, a surface of the sample was covered with a white film due to properties of nitro-compounds, making the sample cloudy, but this is desirable for measurements. In contrast, MALDI matrix materials tend to cause crystallization and aggregation, resulting in many problems including an inability for the primary beam to reach the sample and a consequent failure to generate secondary ions. Also, a control sample was prepared by spotting an acetone solution without containing nitrocellulose on Enkephalin thin films in the same manner as the sample described above. Incidentally, acetone was used as a solvent because of its capability to readily dissolve nitrocellulose.

Next, measurement conditions will be described. TOF-SIMS IV manufactured by ION-TOF GmbH was used for the TOF-SIMS analysis. The measurement conditions are summarized below.

Primary ions: 25 kV $Ga^+$, 2.4 pA (value of pulse current); sawtooth scanning mode Pulse frequency of the primary-ion beam: 3.3 kHz (300 μs/shot)

Primary-ion pulse width: approximately 0.8 ns

Primary-ion beam diameter: approximately 3 μm

Measurement range: 300 μm×300 μm

Pixel count of secondary-ion image: 128×128

Cumulative time: approximately 400 seconds

Mass spectra of positive and negative secondary ions were measured under the above conditions.

Figure 2A:
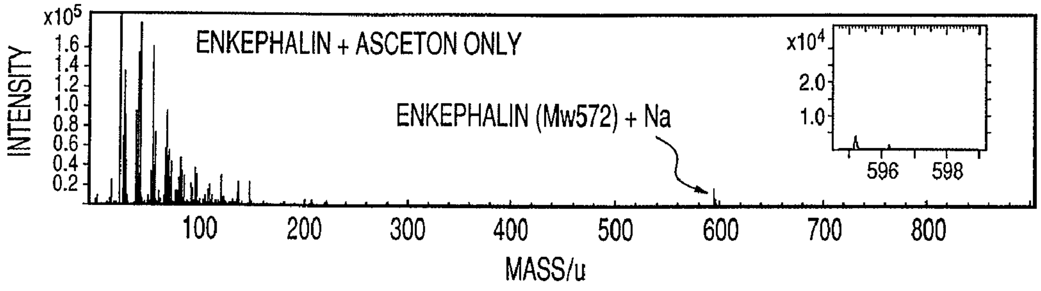
FIGS. 2A, 2B and 2C are comparative diagrams showing mass spectra of positive secondary ions in example 1.
Figure 2B:
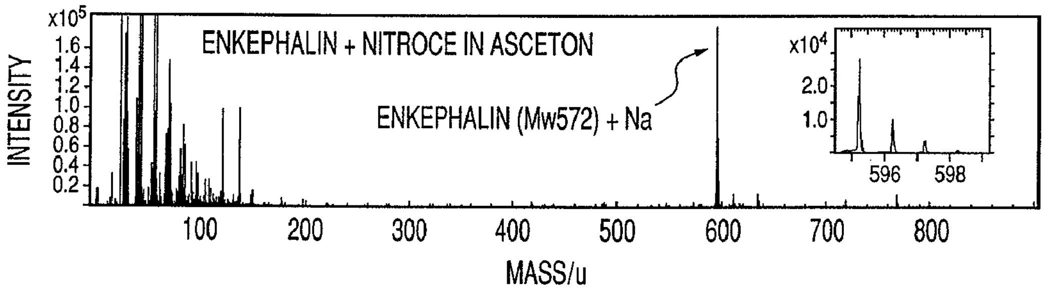
Figure 2C:
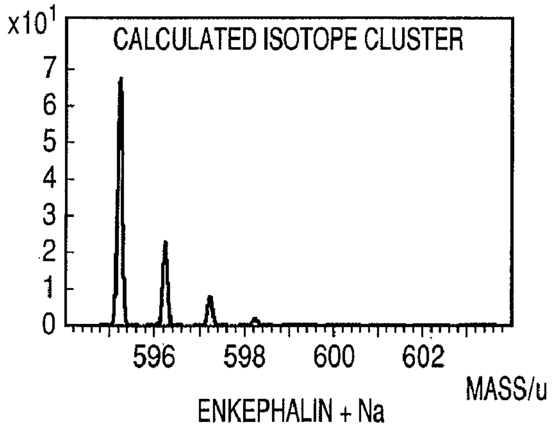

As a result, in the mass spectrum of positive secondary ions of the sample containing nitrocellulose, secondary ions equal in mass to the Enkephalin parent molecule plus sodium (Na) were detected with high intensity. Detection intensity of appropriate secondary ions in the sample containing nitrocellulose was nearly ten times higher than in the control sample without containing nitrocellulose. Observed spectra are shown in FIGS. 2A, 2B and 2C. FIG. 2A shows an observed spectrum obtained from the sample treated with the acetone solution without containing nitrocellulose. FIG. 2B shows an observed spectrum obtained from the sample treated with the acetone solution containing nitrocellulose. An enlarged view of a peak region of the parent molecule to which Na was added is shown in each of the spectrum diagram. FIG. 2C shows a theoretical spectrum of $[(\text{Enkephalin})+(\text{Na})]^+$ calculated based on an isotope abundance ratio. The m/z values coincided in the theoretical spectrum shape and peak positions of $[(\text{Enkephalin})+(\text{Na})]^+$. Furthermore, the use of the secondary ions equivalent to the Enkephalin parent ions provided two-dimensional distribution images which reflect a two-dimensional distribution state of Enkephalin. Incidentally, some Na was contained as impurities in the peptide sample.

Example 2

Fine Imaging (Verification of Spatial Resolution in TOF-SIMS Analysis Using a Sample Treated with Nitroglycerin)

Figure 3A:
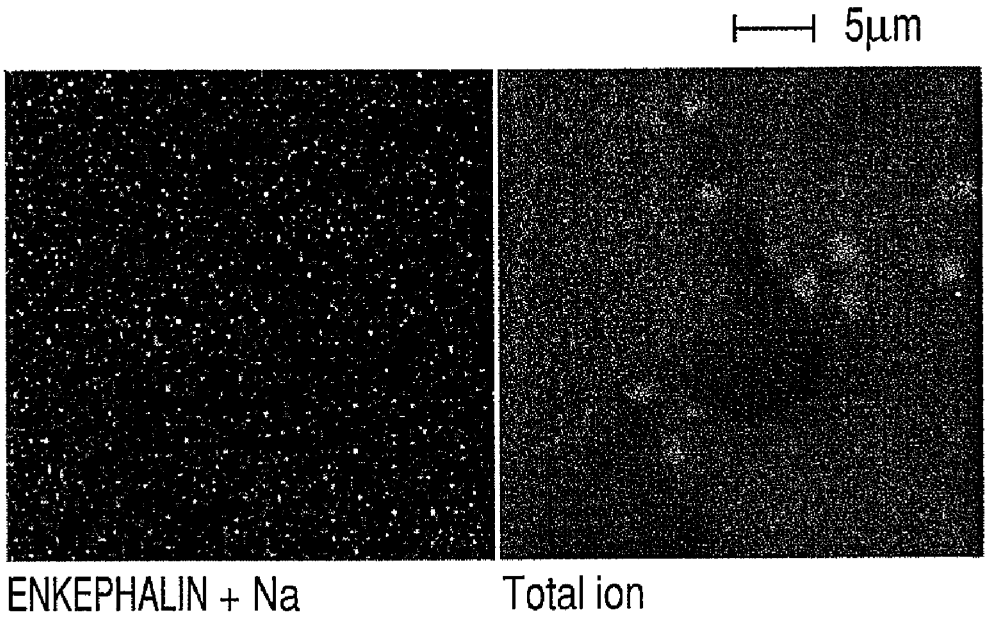
FIGS. 3A and 3B are comparative diagrams showing secondary ion images in high spatial resolution mode in example 2. The figure on the left of FIG. 3A shows an [(Enkephalin)+(Na)] ion image obtained from a peptide film treated with an acetone solution alone for comparison, and the figure on the right of FIG. 3A shows a total ion image obtained by the same measurement; the figure on the left of FIG. 3B shows a similar image obtained from a peptide film treated with an acetone solution of nitroglycerin, where an [(Enkephalin)+(Na)] ion image is detected with a micron-level spatial resolution, and the figure on the right of FIG. 3B shows a total ion image obtained by the same measurement.
Figure 3B:
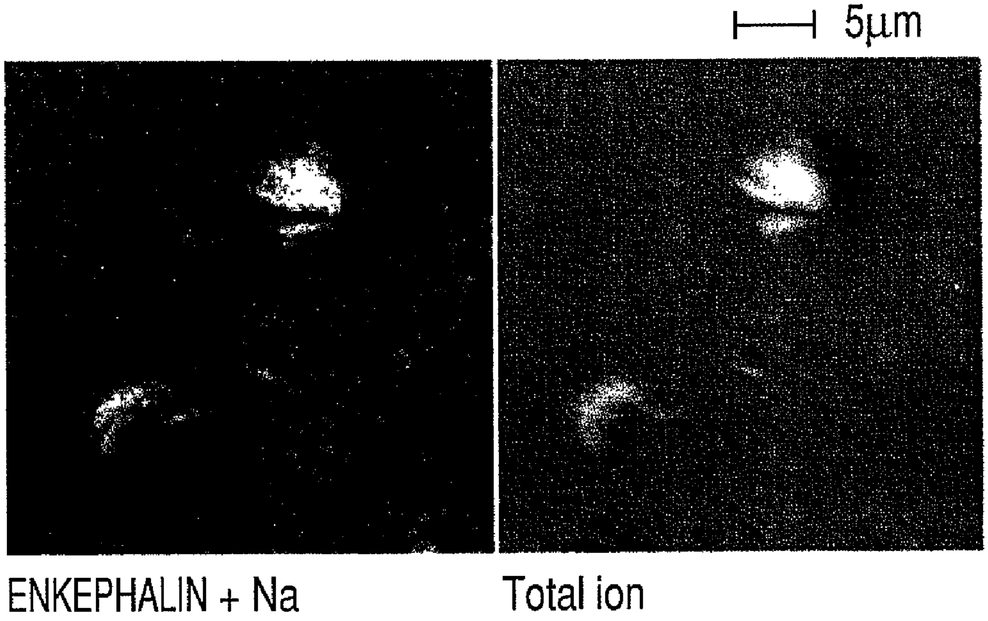

To verify effects of fine imaging, samples were prepared and measurements were taken in a manner similar to Example 1 using nitroglycerin which is suitable for fine imaging because of its high self-reactivity and higher dispersibility than nitrocellulose. A 0.1% solution was prepared by dissolving nitroglycerin in acetone. Fine imaging detection was performed using the samples with and without dropping nitroglycerin using Enkephalin thin films as in Example 1. TOF-SIMS measurements in high spatial resolution mode were taken of those parts in the samples which have fine structures. Results are shown in FIG. 3A and FIG. 3B. The figure on the left of FIG. 3A shows an ion image obtained from the sample treated with the acetone solution without containing nitroglycerin for comparison and the figure on the left of FIG. 3B shows an ion image obtained from the sample treated with the acetone solution containing nitroglycerin. The ion imaging was conducted with a submicron-level high spatial resolution. This shows that the technique according to the present invention readily provides such a high spatial resolution image that can never be obtained by the MALDI technique which uses vaporization based on photoexcitation and heat transmission.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-138946, filed May 25, 2007, which is hereby incorporated by reference herein in its entirety.

What is claimed is:

1. An information obtaining method for obtaining information about a mass of a component of an analyte using a time of flight mass spectrometer and obtaining information about a distribution state of the component based on the obtained information about the mass, comprising:

adding a self-reactive substance to the analyte on a base to facilitate ionization of the component;

irradiating the analyte with a primary beam in the presence of the self-reactive substance, thereby ionizing the components and allowing resulting ions to fly;

obtaining information about a mass of the flying ions using the time of flight mass spectrometer; and obtaining information about the distribution state of the component on the base based on the information about the mass.

2. The information obtaining method according to claim 1, wherein the primary beam is selected from the group consisting of an ion beam, proton beam, electron beam and laser beam which are focused on a surface of the analyte, are pulsed, and are capable of being scanned.

3. The information obtaining method according to claim 2, wherein the primary beam is an ion beam.

4. The information obtaining method according to claim 1, wherein the component is protein.

5. The information obtaining method according to claim 1, wherein the self-reactive substance is added by adding a liquid containing the self-reactive substance to the analyte once to allow the distribution state of the component on the base to be maintained.

6. The information obtaining method according to claim 5, wherein the liquid containing the self-reactive substance is added using a micropipettor or an inkjet printer.

7. The information obtaining method according to claim 5, wherein the liquid containing the self-reactive substance contains as the self-reactive substance at least one selected from the group consisting of organic peroxides, nitric esters, nitro compounds, nitroso compounds, azo compounds, diazo compounds and hydrazine derivatives.

8. The information obtaining method according to claim 7, wherein the self-reactive substance is at least one selected from the group consisting of benzoyl peroxide, methyl ketone peroxide, methyl nitrate, ethyl nitrate, nitroglycerin, nitrocellulose, picric acid, trinitrotoluene, dinitropentamethylenetetramine, azobisisobutyronitrile, diazonitrophenol, hydrazine nitrate, guanidine nitrate and sodium azide.

9. The information obtaining method according to claim 1, wherein the information about the mass of the component is the information about the mass of any one of:

(1) an ion which corresponds to a mass number obtained by adding any of one to ten atoms of one or more elements selected from the group consisting of hydrogen, carbon, nitrogen and oxygen to a mass of a parent molecule, i.e., the mass of the substance itself;

(2) an ion which corresponds to a mass number obtained by adding any of one to ten atoms of one or more elements selected from the group consisting of hydrogen, carbon, nitrogen and oxygen to the mass of the parent molecule, i.e., the mass of the substance itself to which at least one of a metal element and an alkali metal element has been added;

(3) an ion which corresponds to a mass number obtained by removing any of one to ten atoms of one or more elements selected from the group consisting of hydrogen, carbon, nitrogen and oxygen from the mass of the parent molecule, i.e., the mass of the substance itself; and (4) an ion which corresponds to a mass number obtained by removing any of one to ten atoms of one or more elements selected from the group consisting of hydrogen, carbon, nitrogen and oxygen from the mass of the parent molecule, i.e., the mass of the substance itself to which at least one of a metal element and an alkali metal element has been added.

10. The information obtaining method according to claim 1, further comprising obtaining information about a two-dimensional distribution state of the component obtained by primary beam scanning based on detection results of the flying ions.

* * * * *